United States Patent [19]

Abe et al.

[11] Patent Number: 4,775,871

[45] Date of Patent: Oct. 4, 1988

[54] INK JET RECORDING APPARATUS HAVING A FLEXIBLE INK SUPPLY CONNECTION

[75] Inventors: Tsutomu Abe, Isehara; Toshiaki Hirosawa; Yoshie Akiyama, both of Hiratsuka; Isao Ebisawa, Tokyo; Yoshifumi Hattori, Yamato, all of Japan

[73] Assignee: Canon Kabushiki Kaisha, Tokyo, Japan

[21] Appl. No.: 113,391

[22] Filed: Oct. 26, 1987

Related U.S. Application Data

[63] Continuation of Ser. No. 811,459, Dec. 20, 1985, abandoned.

[30] Foreign Application Priority Data

Dec. 28, 1984 [JP] Japan ............................... 59-280719

[51] Int. Cl.[4] ............................................ G01D 15/16

[52] U.S. Cl. ................................................ 346/140 R

[58] Field of Search ........................................ 346/140

[56] References Cited

U.S. PATENT DOCUMENTS

| | | | |
|---|---|---|---|
| 3,708,118 | 1/1973 | Keur | 346/75 X |
| 4,170,016 | 10/1979 | Geil | 346/140 |
| 4,183,031 | 1/1980 | Kyser | 346/140 |
| 4,429,320 | 1/1984 | Hattori | 346/140 |
| 4,599,626 | 7/1986 | Rich | 346/140 |

FOREIGN PATENT DOCUMENTS 199253 12/1984 Japan .

*Primary Examiner*—Joseph W. Hartary

*Attorney, Agent, or Firm*—Fitzpatrick, Cella, Harper & Scinto

[57] ABSTRACT

In an ink jet recording apparatus having an ink jet recording head for discharging liquid and an ink container for containing the liquid therein, the ink jet recording head and the ink container are communicated with each other by an ink passage, and the ink passage has a separating and connecting portion having a communicating member formed of an elastic material and a fitting portion fitted to the communicating member.

13 Claims, 4 Drawing Sheets

INK JET RECORDING APPARATUS HAVING A FLEXIBLE INK SUPPLY CONNECTION

This application is a continuation of application Ser. No. 811,459 filed Dec. 20, 1985, now abandoned.

BACKGROUND OF THE INVENTION

1. Field of the Invention

This invention relates to an ink jet recording apparatus, and in particular to an ink jet recording apparatus provided with an ink container and a recording head separable from each other.

2. Description of the Prior Art

As an ink jet rccrding apparatus, there is known one having a recording head 10 and an ink container 12 mounted on a carriage 14, as shown in FIG. 1 of the accompanying drawings. The carriage 14 is fixed for reciprocal movement on shafts 16 and 18 and is movable along a platen 20.

The recording head 10 has an orifice in the side thereof which is adjacent to the platen 20, and a positioning protruded portion 22 is disposed on one end of the recording head. Further, a needle 24 forming an ink passage and a signal line connecting terminal 26 are disposed at the bottom of the recording head 10.

On the other hand, an aligning recess 28, a needle insertion portion 30 and a connector 32 are disposed on the upper portion of the ink container 12. When the protruded portion 22 of the recording head 10 is fitted into the recess 28, the needle 24 is inserted into the needle insertion portion 30 and the terminal 26 is mounted onto the connector 32. When the recording head 10 is mounted on the ink container 12, the ink in the ink container is supplied to an ink jet nozzle through the needle 24 and a print instruction to the ink jet nozzle is imparted to the ink jet nozzle through the connector 32 and the terminal 26. When a printing pattern signal is supplied to each injection nozzle, ink is discharged onto the paper on the platen 20 and thus, printing is accomplished.

As described above, in the ink jet recording apparatus according to the prior art, where the recording head 10 and the ink ccntainer 12 are removably constructed, the interchange of the recording head 10 can be accomplished easily. However, if the interchange of the recording head 10 is frequently effected, the needle insertion portion 30 may be damaged by the needle 24 and air may enter the ink container 12 through the needle insertion portion 30 to make the supply of the ink impossible or dust in the needle insertion portion 30 may mix in the needle 24 to clog the needle 24, and this has led to the occurrence of an inconvenience that the ink cannot be supplied to the ink jet nozzle.

SUMMARY OF THE INVENTION

The present invention has been made in view of the above-noted problems peculiar to the prior art and an object thereof is to provide an ink jet recording apparatus in which the ink in an ink container can be smoothly supplied to an ink jet nozzle even if the interchange of a recording head is frequently effected.

It is also an object of the present invention to provide an ink jet recording apparatus having an ink jet recording head for discharging liquid and an ink container for containing said liquid therein, said ink jet recording head and said ink container being communicated with each other by an ink passage, said ink passage having a separating and connecting portion having a communicating member formed of an elastic material and a fitting portion fitted to said communicating member.

Other objects of the present invention will become apparent from the following detailed description thereof taken in conjunction with the accompanying drawings.

To achieve the above objects, in the ink jet recording apparatus of the present invention provided with an ink container and a recording head, a communicating member forming an ink passage communicating with the nozzle of the recording head and with the ink container is formed of an elastic material and this communicating member is removably fixed to the ink outlet of the ink container so that the ink in the ink container may be supplied to the nozzle through said communicating member.

DESCRIPTION OF THE PREFERRED EMBODIMENT

A preferred embodiment of the present invention will hereinafter be described with reference to the drawings.

Figure 1:
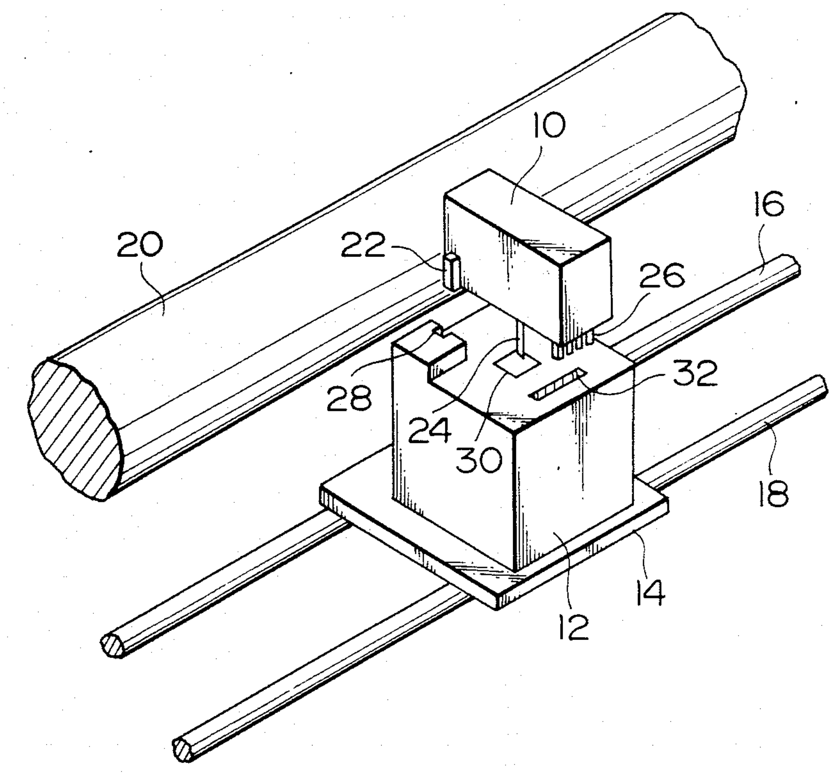
F I G. 1 PRIOR ART
FIG. 1 is a perspective view of an apparatus according to the prior art.
Figure 2:
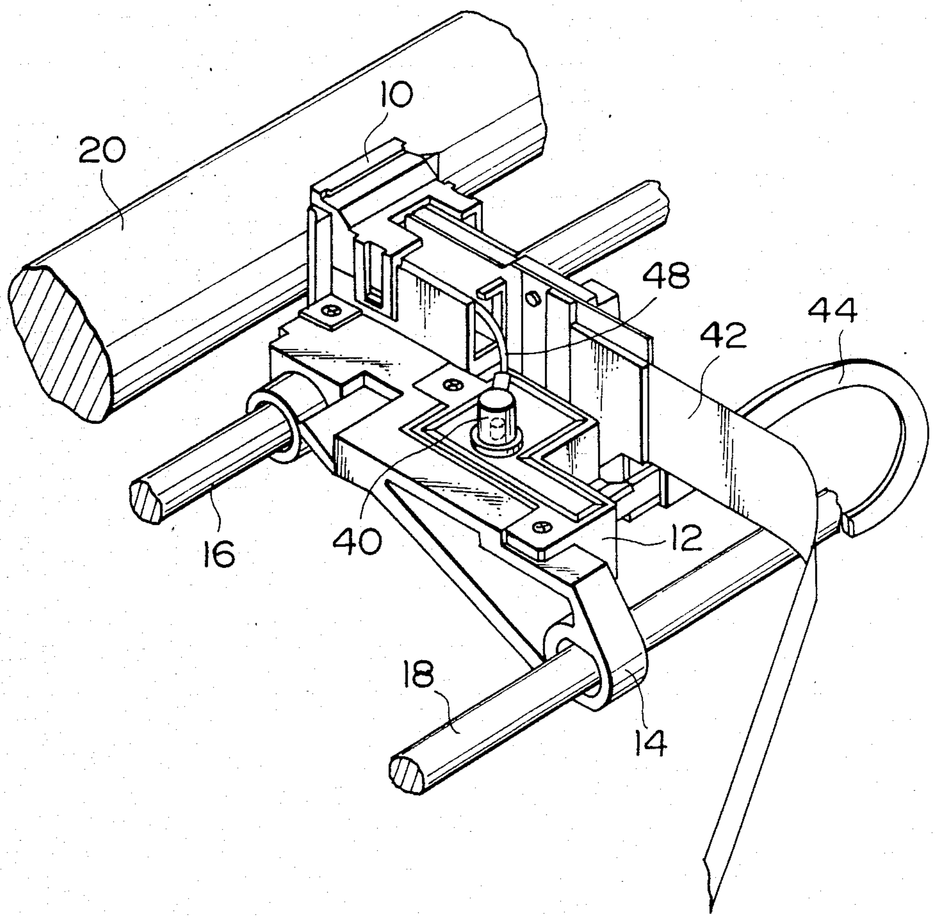
FIG. 2 is a perspective view showing an embodiment of the present invention.

The present embodiment is such that, as shown in FIG. 2, a separating and connecting portion is provided in an ink passage communicating with the nozzle of a recording head 10 and with an ink container 12. An elbow-shaped communicating member 40 forming the ink passage and constituting the separating and connecting portion is constructed of an elastic material. The communicating member 40 is removably fixed to a fitting portion having the ink outlet of the ink container 12 which constitutes the separating and connecting portion and the ink in the ink container 12 is supplied to the nozzle of the recording head 10 through the communicating member 40. In the other points, the present embodiment is similar to the apparatus of FIG. 1 and therefore, in FIG. 2, members similar or corresponding to those in FIG. 1 are given similar reference numerals and need not be described. A flexible print circuit 42 for transmitting a printed pattern signal or the like is connected to the recording head 10, and the ink in a main ink tank is supplied to the ink container 12 through a flexible tube 44.

Figure 3:
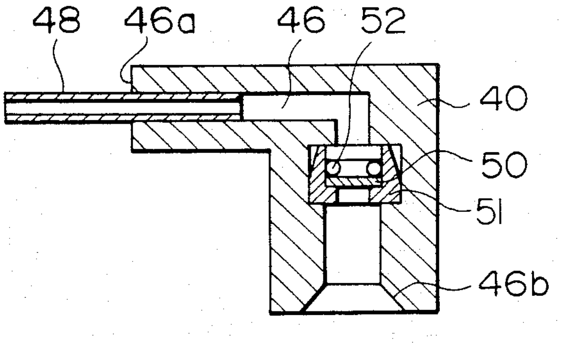
FIG. 3 is a cross-sectional view of a communicating member 40.
Figure 4:
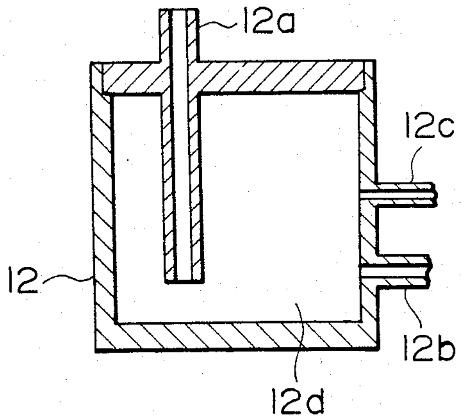
FIG. 4 is a cross-sectional view of an ink container 12.

The communicating member 40, as shown in FIG. 3, has an ink passage 46 communicating with the nozzle of the recording head 10 and with the ink container 12, and a tube 48 which is a supply tube communicating with the ink passage of the recording head 10 is mounted on the ink passage end 46*a* of the communicating member 40. On the other hand, the other end 46*b* of the ink passage 46 of the communicating member 40 is formed into a conelike shape, and the ink passage end 46*b* is constructed so as to fit to the ink outlet 12*a* of the ink container 12 shown in the schematic cross-sectional view of FIG. 4. A filter 50 is mounted (restrained) in the intermediate portion of the ink passage 46 through a case 51. In the present embodiment, the filter 50 is shown as being fixed by an O-ring 52 and the case 51. Thus, even if dust mixes in the ink supplied from the ink container 12 to the recording head 10, the dust will be blocked by the filter 50. Also, the use of the O-ring 52 is more effective to prevent entry of dust. The ink supply port 12*b* of the ink container 12 is connected to the ink tube 44, and an ink suction port 12*c* is formed above the ink supply port 12*b*. This ink suction port 12*c* is provided to control the volume of the ink in the ink container 12 to a predetermined level.

As described above, in the present emodiment, the communicating member 40 for communicating the recording head 10 with the ink container 12 is formed of an elastic material and therefore, when the recording head 10 is to be interchanged, the communicating member 40 formed of an elastic material may be dismounted from the fitting portion provided with the ink outlet 12*a*, instead of the pointed needle 24 being inserted into the needle insertion portion 30 as has heretofore been done, whereby it has become possible to readily accomplish the interchanging work. Further, the ink outlet 12*a* of the ink container 12 is not damaged even by the mounting or dismounting of the communicating member 40 and, even if the work of interchanging the recording head 10 is done frequently, it has become possible to smoothly supply the ink in the ink container 12 to the recording head 10. Furthermore, according to the present embodiment, even if dust or the like mixes in the ink in the ink container 12, the impurities are removed by the filter 50 and thus, it has become possible to smoothly accomplish the supply of the ink to the recording head 10. Also, even when dust accumulates in the filter 50, the communicating member 40 may be removed from the ink outlet 12*a* and the filter 50 may be washed or interchanged, whereby it has become possible to smoothly accomplish the supply of the ink to the recording head 10.

It will be noted that the present invention can be carried out not only in a case where the ink container is provided on the carriage 4, but also in a case where the ink container is provided on the apparatus body side or in the case of the line recording system.

Figure 5:
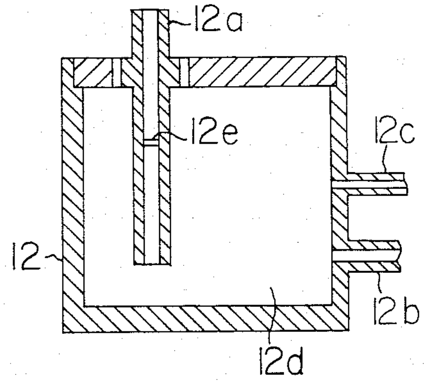
FIG. 5 is a cross-sectional view of another embodiment of an ink container 12.

Also, in the present embodiment, the ink outlet 12*a* which is a fitting portion is provided by a tubular member formed integrally with a member constituting the ink containing portion 12*d*, but of course, the tubular member may be made separately from said member, as shown in FIG. 5, and these may be adhesively or otherwise assembled. In addition, the fitting portion 12*a* could also include a filter 12*e* mounted therein.

Further, in the present embodiment, the communicating member constituting the separating and connecting portion and the fitting member are shown as being respectively provided on the recording head side and the ink container side, but of course, these need not always be so provided. For example, the communicating member and the fitting member may be respectively provided on the ink container side and the recording head side.

The separating and connecting portion may be provided not only at the end of the member forming the ink passage, but also in the intermediate portion thereof The present invention is not restricted to the above-described embodiment, but various modifications thereof are conceivable without departing from the scope of the present invention as defined in the appended claims According to the present invention, as described above, the separating and connecting portion is provided in the ink passage communicating with the nozzle of the recording head and with the ink container, the communicating member constituting the separating and connecting portion is formed of an elastic material and this communicating member is removably fixed to the fitting portion having the ink outlet provided in the ink container so that the ink in the ink container is supplied to the nozzle through the communicating member and therefore, even if the interchange of the recording head is effected frequently, the ink outlet of the ink container can be prevented from being damaged by the mounting or dismounting of the communicating member. Thus, even if the interchange of the recording head is effected frequently, the supply of the ink to the recording head can be accomplished smoothly and reliably, and this contributes to the improved reliability. Further, the interchange of the recording head can be accomplished easily.

We claim:

1. An ink jet recording apparatus comprising:
 - a platen;
 - a carriage movable along said platen;
 - an ink jet recording head, disposed on said carriage, for discharging a liquid;
 - an ink container for containing said liquid therein, said ink container including a flexible tube in fluid communication with an ink tank, said ink container being disposed on said carriage and having a fitting portion with an ink outlet port;
 - a supply tube having a first end connected to said ink jet recording head; and
 - a communicating member formed of an elastic material and being connected to a second end of said supply tube, said communicating member removably fitting with said fitting portion to provide fluid communication between said ink jet head and said ink container through said ink outlet port;

2. An ink jet recording apparatus according to claim 1, wherein said communicating member has a filter.

3. An ink jet recording apparatus according to claim 2 wherein said filter is restrained in an ink passage formed in said communicating member by a case fitted to said communicating member.

4. An ink jet recording apparatus according to claim 3 wherein said communicating member has an O-ring.

5. An ink jet recording apparatus according to claim 1, wherein said elastic material is silicon resin.

6. An ink jet recording apparatus according to claim 1, wherein said communicating member is elbow-shaped.

7. An ink jet recording apparatus according to claim 1, wherein said fitting portion is a tubular member.

8. An ink jet recording apparatus according to claim 7, wherein said tubular member is a supply tube.

9. An ink jet recording apparatus according to claim 1, wherein said fitting portion is provided in said ink container.

10. An ink jet recording apparatus according to claim 1, wherein said fitting portion has a filter.

11. An ink jet recording apparatus according to claim 1, wherein the fitting portion side of said communicating member is cone-shaped.

12. An ink jet recording apparatus according to claim 1, wherein said fitting portion is integrally formed with an ink containing portion of said ink container.

13. An ink jet recording apparatus according to claim 1, wherein said fitting portion is formed separately from an ink containing portion of said ink container.

* * * * *

UNITED STATES PATENT AND TRADEMARK OFFICE

CERTIFICATE OF CORRECTION

PATENT NO. : 4,775,871

DATED : October 4, 1988

INVENTOR(S) : TSUTOMU ABE, ET AL.

It is certified that error appears in the above-identified patent and that said Letters Patent is hereby corrected as shown below:

COLUMN 1

Line 15, "rccrding" should read --recording--.
Line 44, "ccntainer 12" should read --container 12--.

COLUMN 3

Line 11, "emodiment," should read --embodiment,--.

COLUMN 4

Line 36, "port;" should read --port.--.
Line 40, "2" should read --2,--.
Line 44, "3" should read --3,--.

Signed and Sealed this

Twenty-sixth Day of December, 1989

*Attest:*

JEFFREY M. SAMUELS

*Attesting Officer* *Acting Commissioner of Patents and Trademarks*